US012535243B2

(12) United States Patent
Banger et al.

(10) Patent No.: US 12,535,243 B2
(45) Date of Patent: Jan. 27, 2026

(54) VOLUME DAMPER INSERT

(71) Applicants:Balraj Banger, Guelph (CA); Sarabjit Banger, Guelph (CA)

(72) Inventors: Balraj Banger, Guelph (CA); Sarabjit Banger, Guelph (CA)

( * ) Notice: Subject to any disclaimer, the term of this patent is extended or adjusted under 35 U.S.C. 154(b) by 365 days.

(21) Appl. No.: 17/813,727

(22) Filed: Jul. 20, 2022

(65) Prior Publication Data
US 2023/0024902 A1    Jan. 26, 2023

Related U.S. Application Data

(60) Provisional application No. 63/225,754, filed on Jul. 26, 2021.

(51) Int. Cl.
*F24F 13/14* (2006.01)

(52) U.S. Cl.
CPC .......... *F24F 13/14* (2013.01); *F24F 13/1486* (2013.01)

(58) Field of Classification Search
CPC .............................. F24F 13/14; F24F 13/1486
USPC ..................................... 251/90, 308; 454/317
See application file for complete search history.

(56) References Cited

U.S. PATENT DOCUMENTS

| | | | | |
|---|---|---|---|---|
| 356,169 A | * | 1/1887 | Smith | F23L 13/02 251/308 |
| 371,776 A | * | 10/1887 | Mauk | F24F 13/1426 126/295 |
| 567,011 A | * | 9/1896 | Smith | F16K 49/007 137/340 |
| 654,045 A | * | 7/1900 | Anderson | F23L 13/02 251/308 |
| 850,622 A | * | 4/1907 | Clark | F16L 41/08 251/308 |
| 870,309 A | * | 11/1907 | Neal | F23L 13/02 251/313 |
| 1,131,382 A | * | 3/1915 | Johnson | F16K 35/06 251/308 |
| 1,143,422 A | * | 6/1915 | Meador | F23N 3/047 236/103 |
| 1,720,522 A | * | 7/1929 | Ludwick | F23N 3/047 236/49.5 |
| 2,146,142 A | * | 2/1939 | Heasley | F23L 13/00 16/229 |
| 2,183,292 A | * | 12/1939 | Kerentoff | F23L 13/02 16/229 |
| 2,187,767 A | * | 1/1940 | Akers | F24F 11/76 415/12 |

(Continued)

*Primary Examiner* — William M McCalister

(57) ABSTRACT

The present invention provides a versatile and enhanced performance volume damper apparatus for the HVAC industry. In particular, the present invention provides ease of installation in the air supply boot or pipe or duct of a new HVAC system or for retrofit applications where an existing volume damper has failed or is ineffective. The present invention is not restricted by the geometry of the HVAC structures at the site of the installation. Once installed, the operation of the present invention offers an ease of adjustment for balancing an HVAC system and a locking mechanism for the reliable maintenance of the desired air flow. Further, the present invention allows the adjustment and re-adjustment of air flow in the HVAC system as required for the comfortable operation of the system and provides a level of precision in setting the volume of air flow which is unattainable by standard means.

10 Claims, 10 Drawing Sheets

(56) References Cited

U.S. PATENT DOCUMENTS

| | | | |
|---|---|---|---|
| 2,772,850 A * | 12/1956 | Eaton | F16K 1/2261 251/308 |
| 2,835,467 A * | 5/1958 | Guildford | F16K 1/22 411/116 |
| 3,096,071 A * | 7/1963 | Fisher | F16K 1/2268 251/308 |
| 3,512,752 A * | 5/1970 | Uerlichs | F16K 1/24 251/367 |
| 3,521,659 A * | 7/1970 | Seger | F16K 15/033 251/298 |
| 3,627,259 A * | 12/1971 | Williams | F16K 1/24 251/188 |
| 3,722,499 A * | 3/1973 | Lukjan | F23L 13/00 411/401 |
| 4,355,567 A * | 10/1982 | Josephson | F24F 13/1486 126/285 R |
| 4,420,140 A * | 12/1983 | Gachot | F16K 1/22 251/307 |
| 4,715,581 A * | 12/1987 | Myers | F16K 1/22 251/308 |
| 4,744,290 A * | 5/1988 | Josephson | F24F 13/1486 403/388 |
| 5,000,213 A * | 3/1991 | Tervo | F16K 27/0218 251/308 |
| 5,370,361 A * | 12/1994 | Mendell | F16K 1/22 251/307 |
| 5,743,512 A * | 4/1998 | Greenberg | F16K 1/22 251/307 |
| 7,704,008 B2 * | 4/2010 | Shinozaki | F16B 21/186 411/530 |
| 10,302,207 B2 * | 5/2019 | Marak | F24F 13/14 |
| 2013/0065505 A1* | 3/2013 | Yoskowitz | F16J 15/062 384/129 |
| 2015/0034854 A1* | 2/2015 | Gutmann | F16K 35/10 251/308 |
| 2016/0178067 A1* | 6/2016 | Abouelleil | F16K 1/22 251/308 |
| 2023/0024902 A1* | 1/2023 | Banger | F24F 13/14 |

* cited by examiner

VOLUME DAMPER INSERT

BACKGROUND OF THE INVENTION

1. Field of the Invention

The present invention generally relates to devices and methods used to control the volume of air flow in an HVAC system. Specifically, the present invention relates to methods and apparatus, such as a volume damper, employed to regulate the volume of air flowing through the air supply structures of an HVAC system. The application of the present invention for the regulation of the volume of air flow is appropriate where the volume of air flow requires adjustment to attain the comfortable operation of a home, commercial, industrial, or medical HVAC system. This invention finds particular application in new construction installations of HVAC systems in home, commercial, industrial, or medical environments as well in retrofitting failed, failing, or inadequate devices such as volume dampers used for the balancing or general regulation of air flow in such systems in these environments.

2. Description of the Prior Art

Prior art embodiments of the volume damper apparatus are used extensively as an integral part of HVAC system installations. These conventional volume dampers are generally installed during construction in a residential or commercial environment for the purposes of balancing the volume of air flow for the comfort of the users of the HVAC system. The conventional volume damper is comprised of a damper blade and a mounting scheme, usually a bolt attached to the damper blade, which is secured to an air supply pipe with a nut or a wing nut. Due to the limitations of this assembly wherein the tightening of a wing nut fixes the rotational position of the damper blade and secures it in place, balancing of air flow in the HVAC system is cumbersome and not particularly precise. Additionally, the conventional volume damper is particularly prone to loosening of the wing nut holding it in place under the stresses of the system including the air flow itself and vibration so that it begins to rattle noisily and ultimately fails to provide the balancing of air flow for which it was originally intended. Rebalancing an HVAC system using an existing conventional volume damper can be difficult due to often obstructed access to the wing nut securing it in place particularly in residential environments wherein HVAC components are often behind drywall and of limited overall balancing effectiveness as discussed previously.

SUMMARY OF THE INVENTION

The present invention allows a technician to install a volume damper insert in the air supply boot or pipe or duct of an HVAC system. The novel volume damper insert of the present invention provides an ease of installation in both new constructions and as a retrofit or replacement volume damper in an HVAC system wherein air flow balancing performance, maintenance, durability, and ease of adjustment are desired. In particular, the volume damper insert allows for installation in an existing air supply boot or pipe or duct where prior art embodiments would make installation, replacement of an existing volume damper and adjustment thereof cumbersome or impracticable.

Upon installation of the volume damper insert in the air supply boot or pipe or duct of an HVAC system, a technician is able to precisely balance the HVAC system by manually adjusting the rotational position of the damper blade of the assembly either internally, inside the air supply boot or pipe or duct, or by means of a nut external to the air supply structure. Manual adjustment by these means typically allows the technician to achieve an air flow measurement within ±1 CFM of a targeted value without difficulty and thus achieves an adjustment precision unattainable by prior art embodiments. Consequently, the present invention is well suited to both positive and negative pressure ventilation systems in commercial and industrial environments and particularly in hospitals wherein precise adjustment of the volume of air flow is critical for health and safety purposes. The tension based locking mechanism of the present invention allows the rotational position of a damper blade to be fixed indefinitely and adjusted as desired without fear of loosening due to vibration or other stresses within the HVAC system. The versatility and ease of installation in new and retrofit applications, the ease and simple access of operation for balancing and rebalancing purposes, the precision of the air flow adjustment provided, and the reliability of the locking facility of the present invention provide enhanced performance and efficiency of implementation greatly exceeding that of prior art embodiments while being generally free of the deficiencies thereof.

DETAILED DESCRIPTION OF THE PREFERRED EMBODIMENTS

The figures described above are referenced below for the purpose of describing various but not all embodiments of the present invention and are not intended to limit the scope of the present invention.

The primary objective of the present invention is to provide a Volume Damper Insert which can be installed in the air supply boot or pipe of an HVAC system during or after the completion of construction or to replace a conventional volume damper that is damaged, diminished in effectivity, or has failed catastrophically.

The above objective is achieved by fastening the Volume Damper by using a mechanism on a mounting bracket and then whole assembly is inserted into the ductwork and secured to it.

Advantages and novel features of the invention will become more apparent from the following detailed description when taken in conjunction with the accompanying figures.

Figure 1:
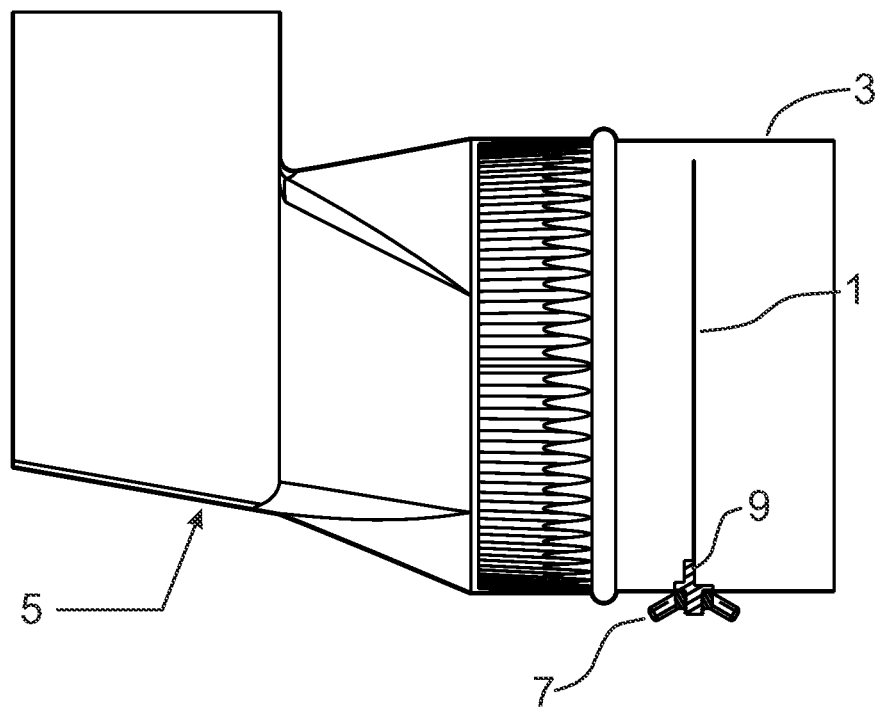
FIG. 1 is a cross-sectional view of an air supply boot and pipe with a conventional damper installed.
Figure 2:
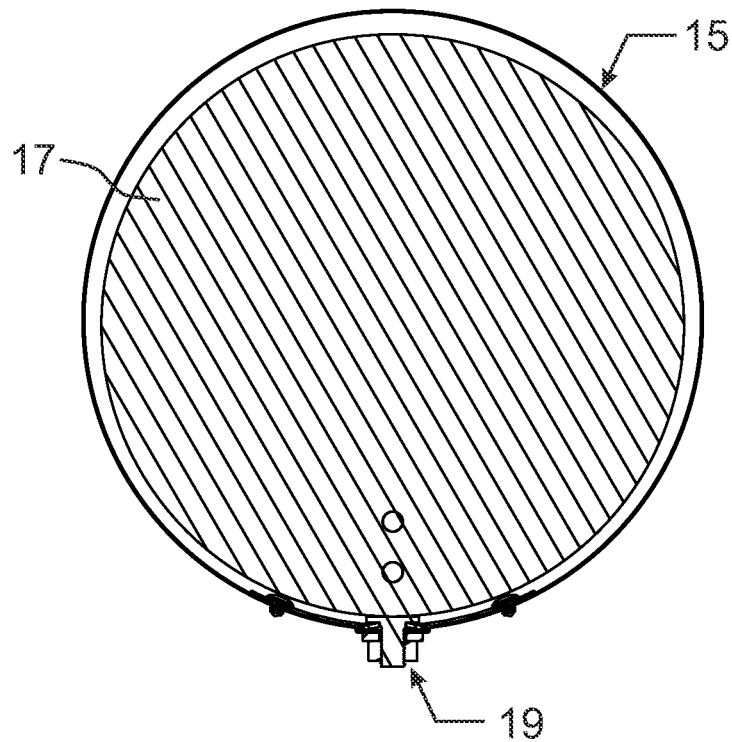
FIG. 2 is an illustration of an embodiment of the volume damper insert assembly installed in an air supply pipe.
Figure 3:
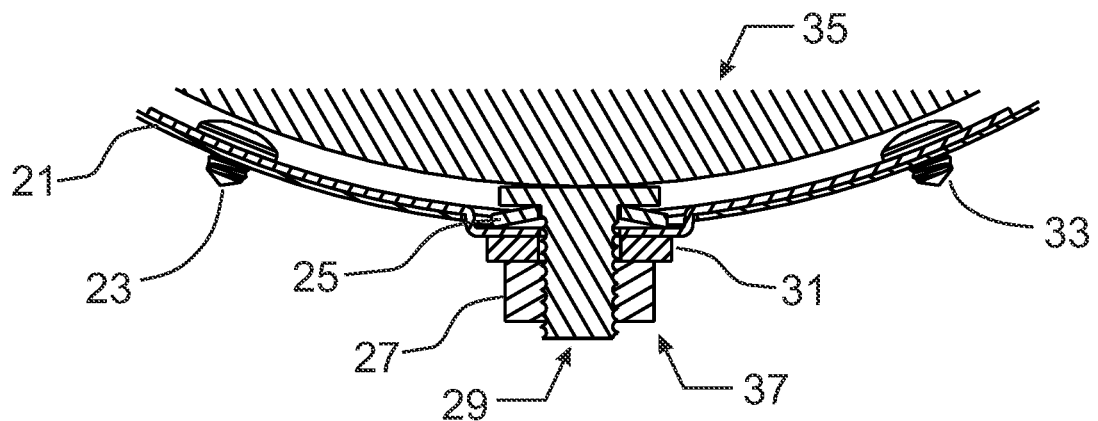
FIG. 3 is a detailed view of a cross-section of the locking mechanism of the present invention installed in an air supply pipe.

A conventional volume damper installation will be described with reference to FIG. 1 in order to better understand the site of the application of the present invention. A conventional volume damper is shown as in FIG. 1 comprising a volume damper blade 1 and a duct engagement means illustrated as a wing nut 7. Said conventional volume damper of is shown to be installed within the air supply boot and pipe assembly 5. Herein, said conventional volume damper assembly comprising volume damper blade 1, volume damper holder 9, and external securing means 7, in this case shown to be a wing nut, are shown to be installed within the pipe portion 3 of said assembly 5. It is understood that the pipe portion 3 of said assembly 5 is provisioned with a hole to allow the lower portion of the volume damper holder 9 to pass through in order to engage the external securing means 7. The described conventional volume damper assembly and installation is implemented in the vast majority of building constructions in order to balance air flow in the HVAC system. When this assembly begins to rattle under use, diminishes in performance, or fails entirely or when the HVAC system requires air flow balancing where said external securing means 7 is inaccessible or obstructed by drywall for instance, the utility of the present invention will become apparent.

In order to better understand the present invention, embodiments of the volume damper insert assembly will be described with reference to FIGS. 2 through 9. An embodiment of a volume damper insert is shown to be installed in a cross-section of pipe 15 as in FIG. 2. The volume damper insert comprises a volume damper blade 17 and a mounting and locking assembly 19. A detailed view of the mounting and locking assembly 35 is provided in FIG. 3. Screws 23 and 33 are used to secure the assembly to the wall of pipe 21. Locking mechanism 37 comprises a disc washer 25, a spacer 31, and nut 27 engaging the threaded portion of the damper holder assembly 29. It is understood that the profile geometry of said damper blade 17 is not limited by the present invention and is only restricted by the geometry at the site of the work as depicted by pipe 15 in FIG. 2. Said damper blade 17 profile may take on circular, oval, square, and rectangular shapes as required by the work but is not limited to these.

Figure 4:
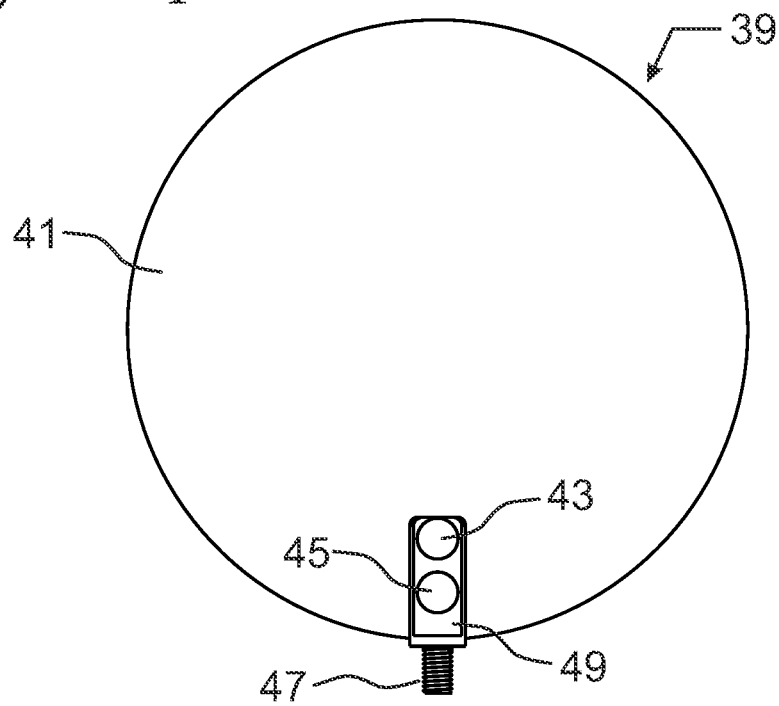
FIG. 4 is a view of a volume damper assembly from the side showing the damper holder assembly of the present invention.
Figure 5:
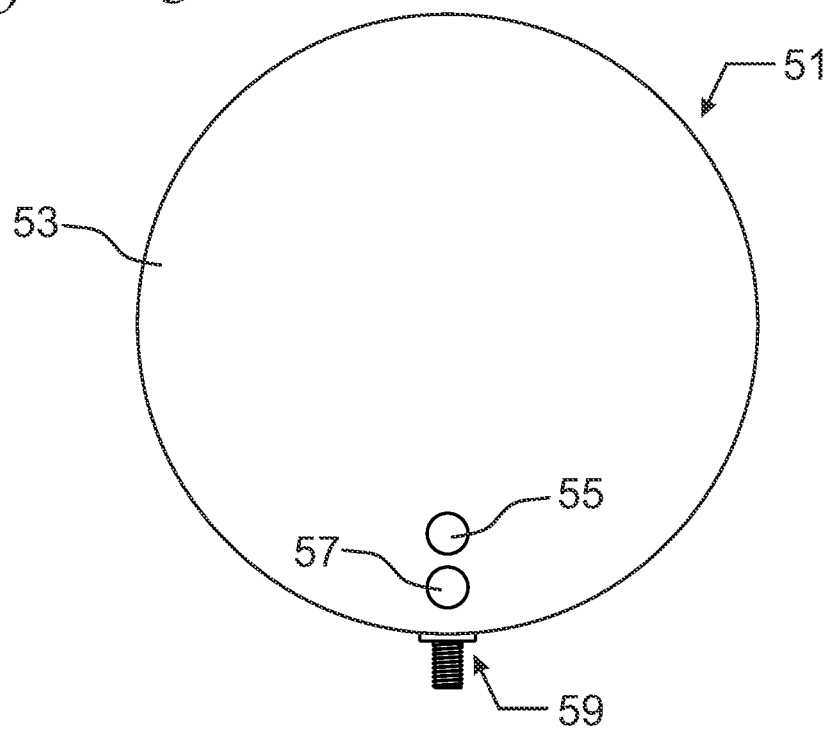
FIG. 5 is a view of a volume damper assembly from the side only showing the rivets engaging the damper holder assembly of the present invention.

An embodiment of the volume damper assembly will be described with reference to FIGS. 4 and 5. A volume damper assembly 39 is provided as in FIG. 4 comprising a damper blade 41, damper holder 49, and rivets 43 and 45. Said rivets 43 and 45 affix said damper blade 41 to said damper holder 49. Said damper holder 49 is further provisioned with a threaded lower portion 47. A volume damper assembly 51 is similarly provided in FIG. 5 comprising a damper blade 53, damper holder assembly 59, and rivets 55 and 57. Herein, the damper holder assembly 59 is shown to be engaging the damper blade 53 on the unseen side. It is understood that the method to secure the damper blade 53 to the damper holder assembly 59 can be achieved by said rivets 55 and 57 but could also be achieved by welding or other secure mechanical means.

Figure 6:
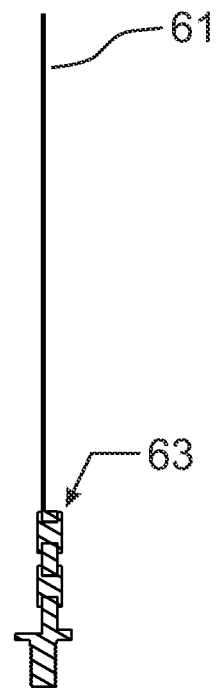
FIG. 6 is a cross-sectional side view of the volume damper blade engaged with the damper holder assembly.
Figure 7:
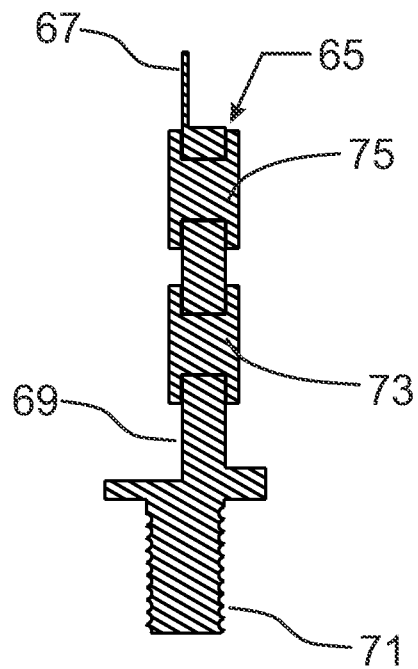
FIG. 7 is a detailed view of a cross-section of the volume damper holder assembly.

In order to illustrate the volume damper assembly from another perspective, a volume damper assembly is provided as in FIG. 6 wherein the damper blade 61 is shown to be engaging the damper holder sub-assembly 63 in a side cross-sectional view. Further detail of the damper holder sub-assembly 65 is revealed in FIG. 7. Said damper holder sub-assembly 65 is comprised of damper holder body 69, threaded lower portion of damper holder 71, and rivets 73 and 75. Said damper holder sub-assembly 65 engages the lower portion of the damper blade 67 by means of rivets 73 and 75.

Figure 8:
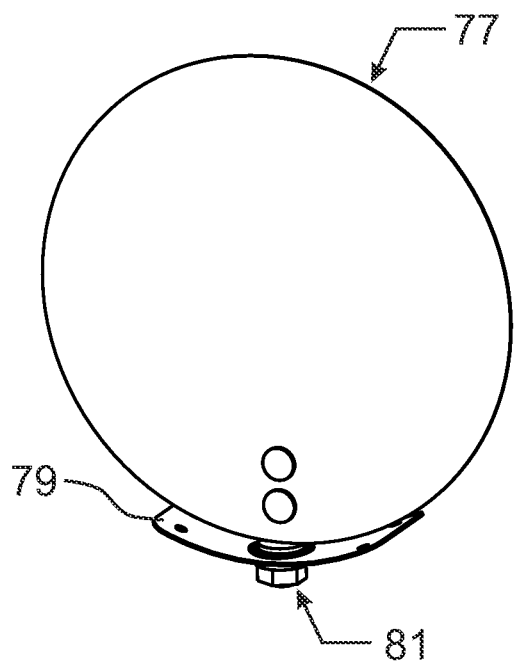
FIG. 8 is an isometric view of the volume damper insert assembly with mounting bracket and self locking assembly.
Figure 9:
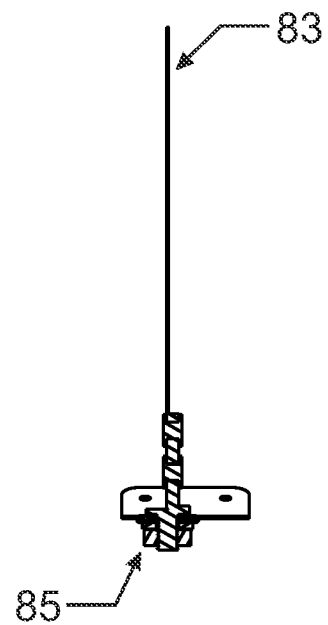
FIG. 9 is a cross-sectional side view of the volume damper insert assembly with mounting bracket and self locking assembly.

A volume damper assembly with attached mounting bracket and locking mechanism will be described with reference to FIGS. 8 and 9. A volume damper assembly 77 is provided and shown to be engaging a mounting bracket 79 and locking mechanism 81 in FIG. 8. A side cross-sectional perspective is provided in FIG. 9 of the volume damper assembly 83 and the mounting bracket and locking mechanism assembly 85.

Figure 10:
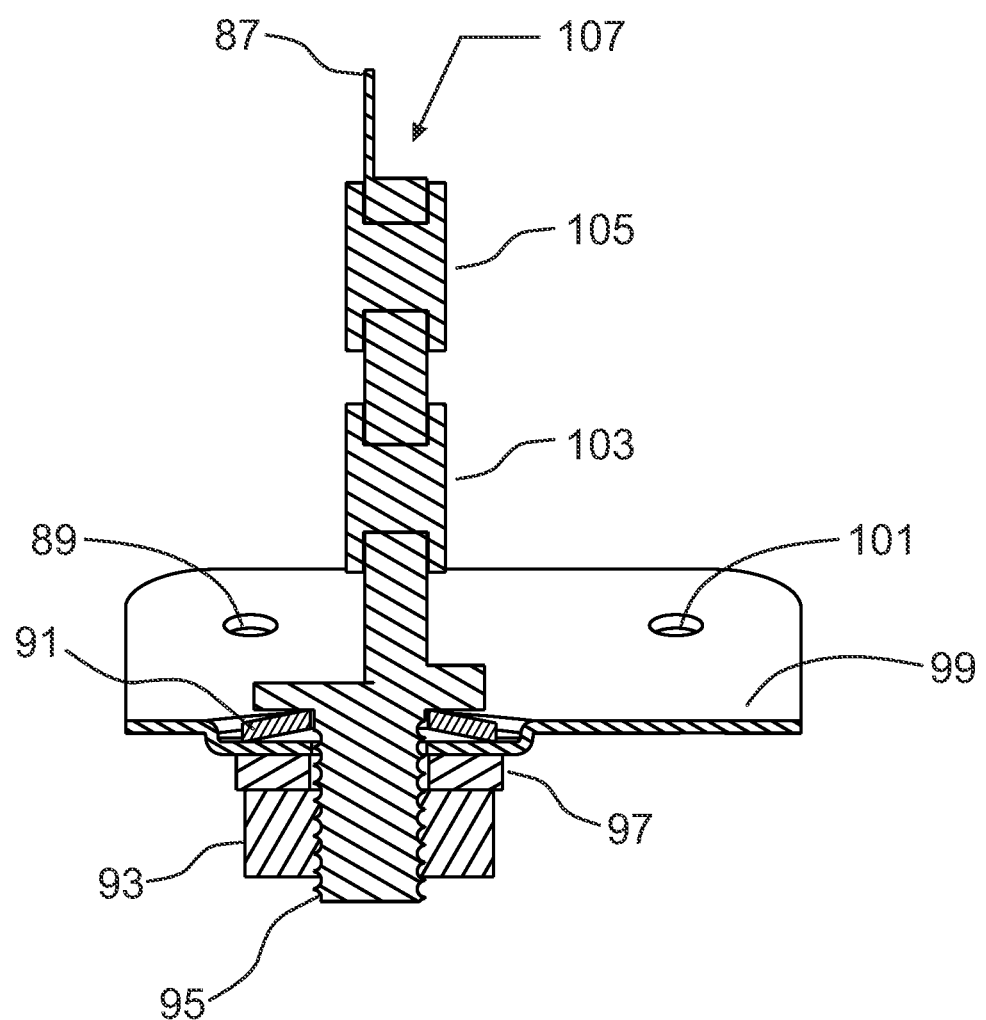
FIG. 10 is a detailed cross-sectional view of the self locking assembly of the present invention.
Figure 11:
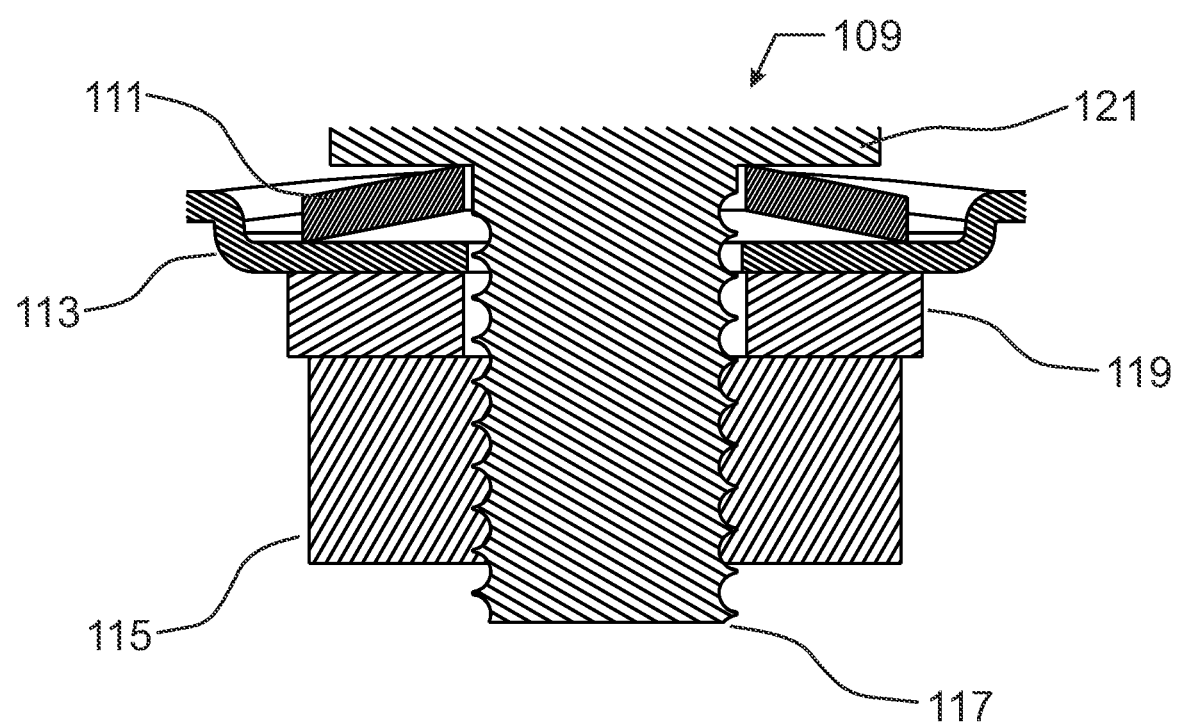
FIG. 11 is a detailed cross-sectional view of the lower portion of the self locking assembly of the present invention.

In order to better understand the mounting bracket and locking mechanism assembly, reference will be made to FIG. 10. A volume damper mounting assembly 107 is provided in FIG. 10 comprising a damper holder 95, mounting bracket 99, disc washer 91, spacer 97, and nut 93. The damper holder 95 engages the lower portion of the damper blade 87 by means of rivets 103 and 105 as before. Said mounting bracket 99 is provisioned with holes such as pilot holes 89 and 101 in order to provide engagement means at the site of installation. Said holes 89 and 101 can be used to engage screws for affixing the volume damper mounting assembly 107 at the site of installation or dimples in the material at the site of installation.

To provide further detail as to the operation of the volume damper locking mechanism, reference will be made to FIGS. 8, 9, 10 and 11. A volume damper locking mechanism 109 is provided as in FIG. 11. Said locking mechanism 109 comprises a disc washer 111, a profiled bracket 113, a spacer 119, and a nut 115 each engaging the threaded lower portion of a damper holder 117. Said disc washer 111 rests in the cavity provided by said profiled bracket 113 while the threaded lower portion of the damper holder 117 passes through a hole provisioned for this purpose in said profiled bracket 113 and from the inside to the outside of an installation hole in the collar of an air supply boot or wall of a pipe or duct. The spacer 119 and nut 115 are engaged on the outside of the collar of said air supply boot or wall of pipe or duct on the side of the profiled bracket 113 not housing said disc washer 111. The spacer 119 is incorporated herein to avoid metal to metal contact between said profiled bracket 113 and said nut 115. The assembly of the damper holder flange 121, said profiled bracket 113, spacer 119, and nut 115 compress the disc washer 111 upon tightening of nut 115. Said nut 115 may be locked in place to avoid loosening due to operational stresses or vibration, if so desired and as required by the work, with an adhesive such as a thread locking adhesive, a common component in the toolbox of a technician, without impacting the functionality of the present invention. It is understood that said profiled bracket 113 may be installed on the inside or outside of the collar of an air supply boot or pipe or duct wherein the compression of said disc washer 111 by the aforementioned components as required by the operation of the present invention is unimpeded. The compression of the disc washer 111 by the force exerted through the tightening of nut 115 of FIG. 11 exerts a force on the damper holder 95 of FIG. 10 thereby preventing unintended movement or rotation of damper assemblies 77 and 83 of FIGS. 8 and 9 respectively once installed in an air supply boot or pipe or duct. By these means, an operator is able to secure or lock the position of a damper blade at the site of installation in an air supply boot or pipe or duct. Further by these means, the operator can adjust the rotational position of a damper blade in the act of balancing the air flow in a system by manipulating the damper blade itself internally within an air supply boot or pipe or duct or externally using said nut 115 in order to achieve a precision in air flow control in terms of CFM otherwise unattainable by the prior art. It is understood that in place of said nut 115 and threaded lower portion of a damper holder 117 a slotted damper holder may be used to engage a retaining washer to the same effect without departing from the scope or spirit of the present invention. It is further understood that an air supply boot or pipe or duct may itself be provisioned with a profile like that illustrated as part of profiled bracket 113 of FIG. 11 to achieve the same locking functionality of a volume damper insert assembly as described above without departing from the scope and spirit of the present invention.

Figure 12:
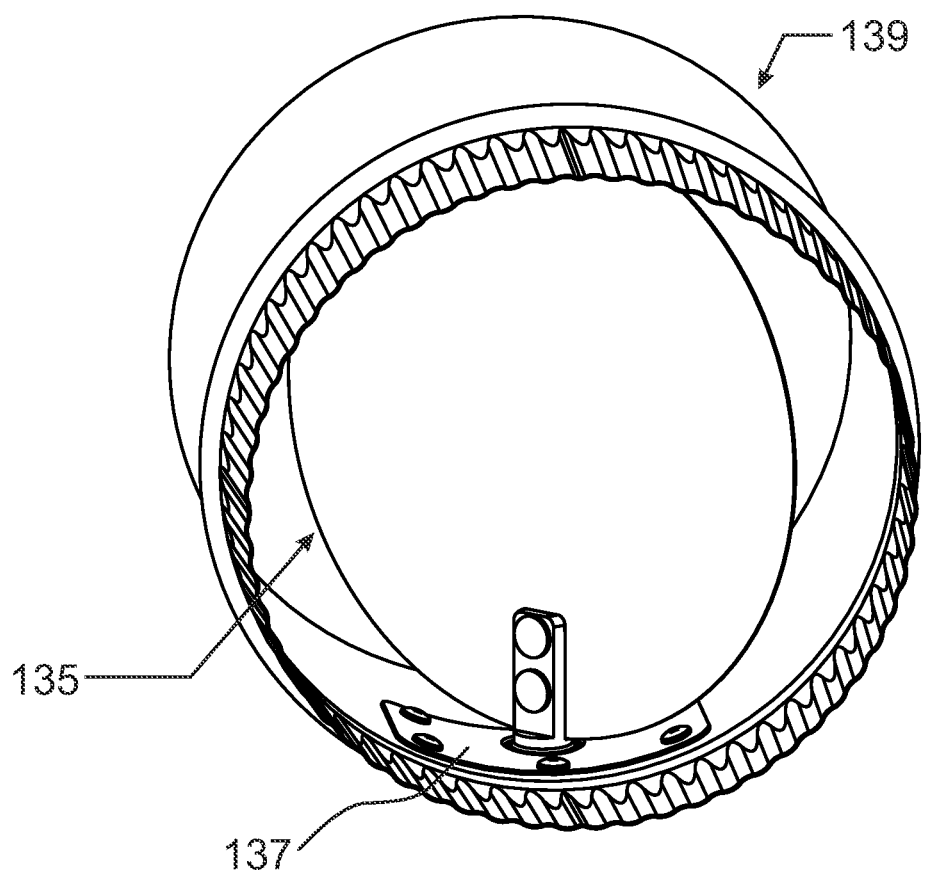
FIG. 12 is an isometric view of an embodiment of the present invention installed in an air supply pipe with a mounting bracket.

An embodiment of the present invention is installed within an air supply pipe as in FIG. 12. The air supply pipe 139 has volume damper assembly 135 affixed to the inside wall of said pipe 139 by means of mounting bracket 137. The volume damper assembly 135 is shown to be rotated within said pipe 139 permitting air flow and demonstrating the function of the apparatus. It is understood that the mounting bracket of the present invention such as mounting bracket 137 of FIG. 12 may be made of magnetic material to assist in the installation of the present invention in an air supply boot or pipe or duct.

Figure 13:
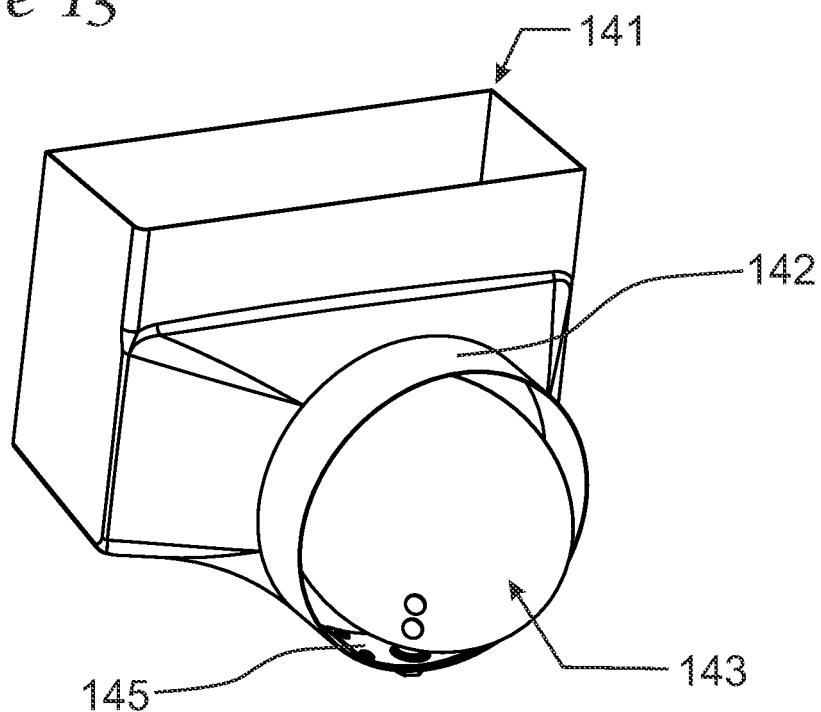
FIG. 13 is an isometric view of an embodiment of the present invention installed in an air supply boot with a mounting bracket.
Figure 14:
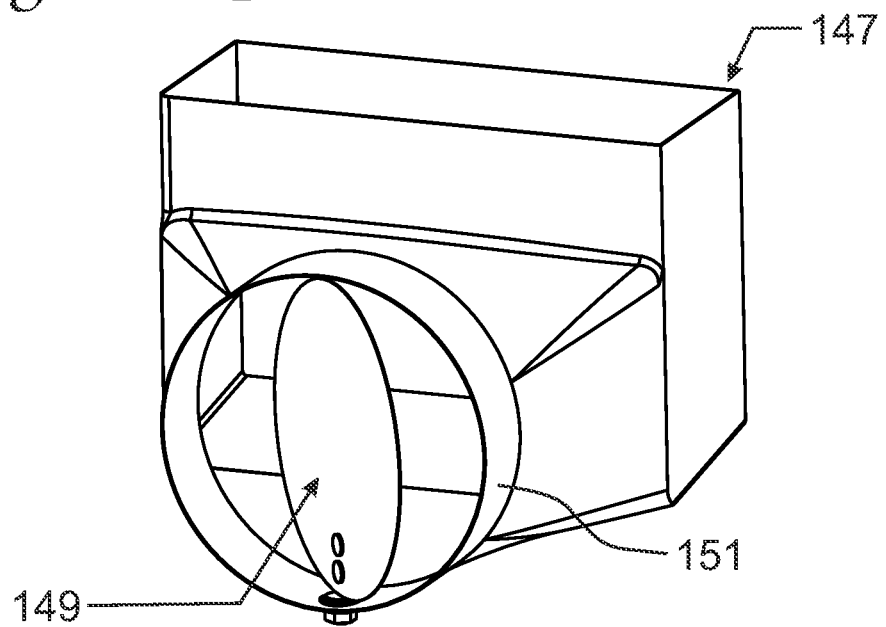
FIG. 14 is an isometric view of an embodiment of the present invention installed in an air supply boot so provisioned without a mounting bracket.

An embodiment of the present invention is installed within an air supply boot as in FIG. 13. The air supply boot 141 has volume damper assembly 143 affixed to the collar 142 of said boot 141 by means of mounting bracket 145. The volume damper assembly 143 is shown to be rotated within said boot 141 permitting air flow and demonstrating the function of the apparatus. It should also be apparent from FIG. 13 that said collar 142 of air supply boot 141 may in some cases be inadequate in size or material to accommodate said mounting bracket 145 or present difficult access at the site of the installation. For this reason, it may ease installation of the intended apparatus using the configuration of FIG. 14. An embodiment of the present invention is provided as in FIG. 14 wherein a volume damper assembly 149 is installed in an air supply boot 147. In this embodiment, the volume damper assembly 149 is installed without a bracket. Instead of a bracket, the collar 151 of boot 147 is provisioned with a profile similar to that of profiled bracket 113 of FIG. 11 as described previously. The volume damper assembly 149 is shown to be rotated within said boot 147 permitting air flow and demonstrating the function of the apparatus.

Figure 15:
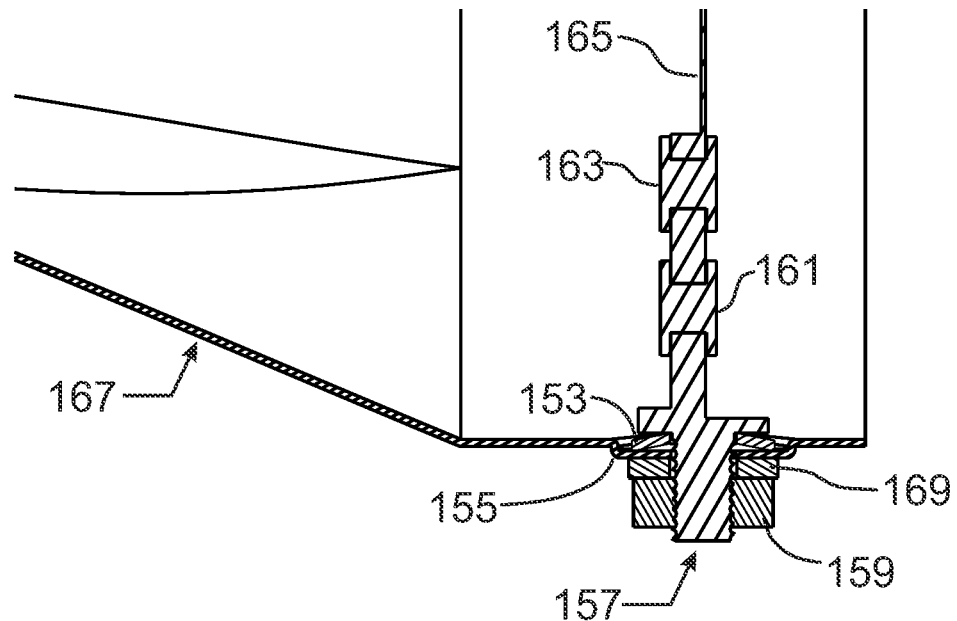
FIG. 15 is a cross-sectional side view of the portion of the air supply boot provisioned to engage the volume damper insert assembly without a mounting bracket.

In order to better understand the locking mechanism of the volume damper insert within an air supply boot without a bracket, reference will be made to FIG. 15. The lower portion and collar of air supply boot 167 is illustrated in FIG. 15. Herein, the said boot 167 is provisioned with a profiled collar 155 to accommodate the damper holder assembly 157 and damper position locking mechanism. The damper position locking mechanism comprises disc washer 153, said profiled collar 155, spacer 169, and nut 159. The damper holder assembly 157 engages said damper position locking mechanism as that of FIG. 11 and operates similar to the locking mechanism of described therein. The damper holder assembly 157 is illustrated to engage damper blade 165 by means of rivets 161 and 163.

Figure 16:
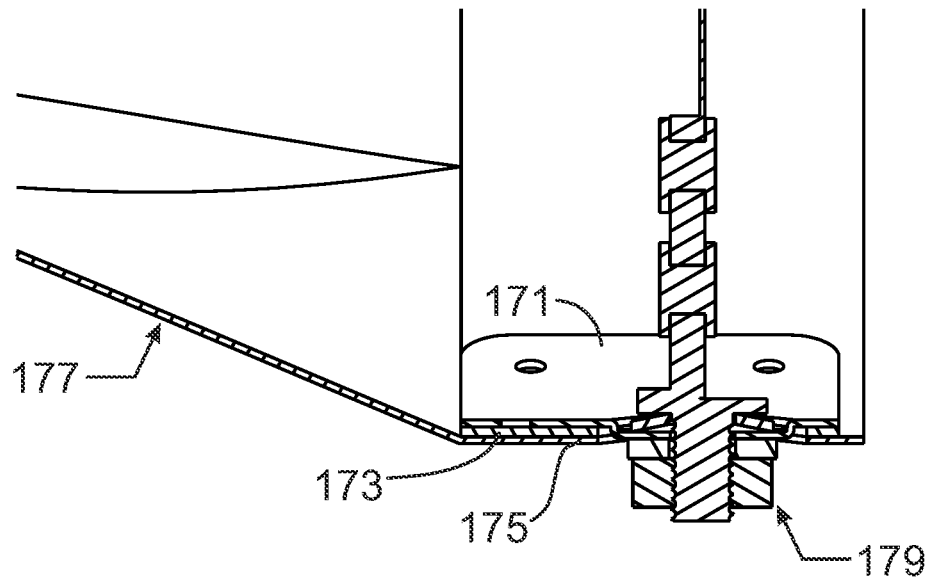
FIG. 16 is a cross-sectional side view of the portion of the air supply boot engaging the mounting assembly of the present invention with adhesive tape.

In another embodiment of the present invention, another volume damper insert mounting method is illustrated as in FIG. 16. The lower portion of an air supply boot 177 is provided as in FIG. 16 with a volume damper insert assembly 179 mounted in the collar wall 175 of said boot 177. A mounting bracket 171 is provided such that the side in contact with said collar wall 175 is provisioned with an adhesive tape 173 thereby adhering this side of the mounting bracket 171 to the collar wall 175. This approach eases installation of the volume damper insert assembly 179 at sites with difficult access. It is understood that an adhesive tape such as adhesive tape 173 may be implemented at the site of installation in a pipe or duct by adhesion to a mounting bracket such as mounting bracket 171 installed thereon.

We claim as our invention:

1. A volume damper insert assembly comprising:
   a damper blade;
   a damper holder fixedly attached to a lower portion of the damper blade, the damper holder comprising a threaded lower portion and a flange; and
   a locking mechanism configured to secure a rotational position of the damper blade within an air supply boot, a pipe, or a duct, wherein the locking mechanism comprises a disc washer, a spacer, a nut engaging the threaded lower portion of the damper holder, and a profiled bracket positioned separate from and above the spacer so as to house the disc washer and allow the threaded lower portion of the damper holder to pass through, wherein the disc washer touches the flange on one side and the profiled bracket on the other side, and wherein the nut is configured to compress the disc washer against the profiled bracket via the spacer to secure the rotational position of the damper blade.

2. The volume damper insert assembly of claim 1, wherein the spacer is positioned between the nut and the profiled bracket to prevent metal-to-metal contact, thereby maintaining integrity of the locking mechanism.

3. The volume damper insert assembly of claim 1, wherein the locking mechanism is configured to be installed internally to the air supply boot, pipe, or duct, allowing for manual adjustment of the damper blade's rotational position.

4. The volume damper insert assembly of claim 1, wherein the profiled bracket is provisioned with holes or dimples to assist in locating appropriate fastening points on collar of the air supply boot or wall of the pipe or duct and comprises a cavity to house the disc washer.

5. The volume damper insert assembly of claim 1, wherein the locking mechanism is configured to prevent unintended movement or rotation of the damper blade due to operational stresses or vibration.

6. The volume damper insert assembly of claim 1, wherein the disc washer is compressed upon tightening of the nut, developing a tension that opposes rotation of the damper holder, thereby securely locking the rotational position of the damper blade.

7. The volume damper insert assembly of claim 1, wherein the damper holder is affixed to the damper blade by means of rivets, welding, or other secure mechanical means.

8. The volume damper insert assembly of claim 1, wherein the locking mechanism allows for adjustment of the damper blade's rotational position by manipulating the damper blade internally through the air supply boot, pipe, or duct.

9. The volume damper insert assembly of claim 1, further comprising a mounting bracket and is affixed to collar of the air supply boot or wall of the pipe or duct of an HVAC system by means of adhesive tape thereby securing the assembly.

10. The volume damper insert assembly of claim 1, further comprising a thread locking adhesive applied to the nut to secure it in place and prevent loosening due to operational stresses or vibration.

\* \* \* \* \*